United States Patent [19]
Linn et al.

[11] 3,735,164
[45] May 22, 1973

[54] DRIVE ARRANGEMENT INCLUDING A SYNCHRONOUS MOTOR

[75] Inventors: Wallace L. Linn; Bill G. Kilmer; Richard H. Weber, all of Indianapolis, Ind.

[73] Assignee: P. R. Mallory & Co. Inc., Indianapolis, Ind.

[22] Filed: Sept. 16, 1971

[21] Appl. No.: 181,177

[52] U.S. Cl. ................... 310/41, 310/83, 310/156, 310/164
[51] Int. Cl. ............................................. H02k 7/10
[58] Field of Search ................... 310/162, 163, 164, 310/156, 41, 80, 83

[56] References Cited
UNITED STATES PATENTS

| | | | |
|---|---|---|---|
| 3,307,056 | 2/1967 | Woolley | 310/164 |
| 2,985,778 | 5/1961 | Fritz | 310/164 |
| 3,448,306 | 6/1969 | Murray | 310/162 |
| 3,308,315 | 3/1967 | Mahon | 310/164 |
| 3,189,771 | 6/1965 | Danek | 310/164 |
| 3,032,670 | 5/1962 | Fritz | 310/164 |
| 3,027,469 | 3/1962 | Sidell | 310/162 |
| 3,231,770 | 1/1966 | Hyde | 310/162 |
| 3,447,008 | 5/1969 | Regner | 310/164 |

Primary Examiner—R. Skudy
Attorney—Richard H. Hildress, Robert F. Meyer and Henry W. Cummings

[57] ABSTRACT

A synchronous motor and a rotating motion transmission arrangement, the synchronous motor including a rotor having a driving surface operable in a plane substantially normal to the axis of the rotor, the rotating motion transmission arrangement being responsive to the driving surface and operable in a plane substantially normal to the plane of the driving surface, with each of the driving surface and the rotating motion transmission arrangement including a means cooperating with one another to prevent the rotor from rotating in a wrong direction. The stator structure of the synchronous motor has poles arranged in groups whereby good starting characteristics and relatively high running torque is achieved in a relatively small amount of confined space. A coil bobbin includes a spool arranged for receiving electrical terminals and adapted to provide passage for a wire of a winding to the electrical terminals within the confines of the spool. The spool is unitarily constructed with a base member, the base member adapted to align and maintain the spool, the permanent magnet rotor and the stator structure in cooperating working relationship with each other.

17 Claims, 10 Drawing Figures

Patented May 22, 1973

INVENTORS
WALLACE L. LINN
BILL G. KILMER
RICHARD H. WEBER

BY Robert J Meyer

ATTORNEY

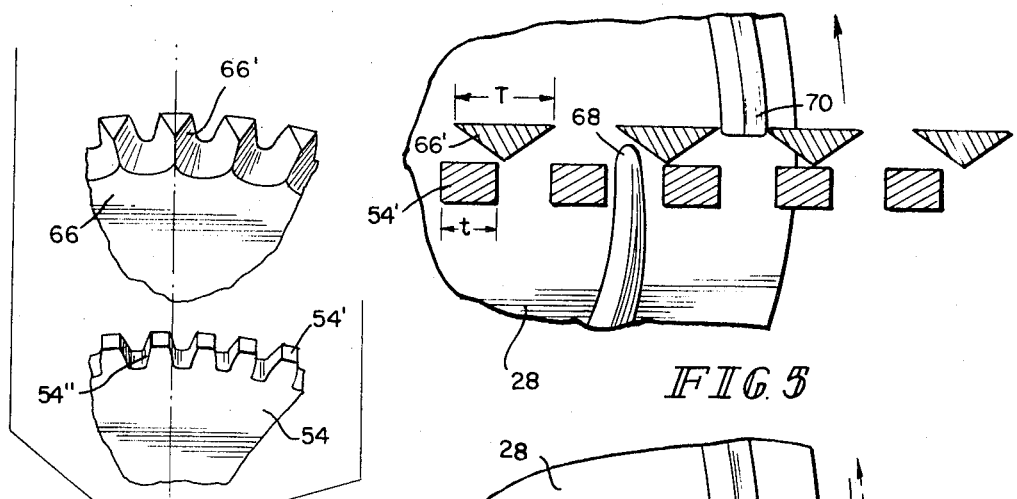
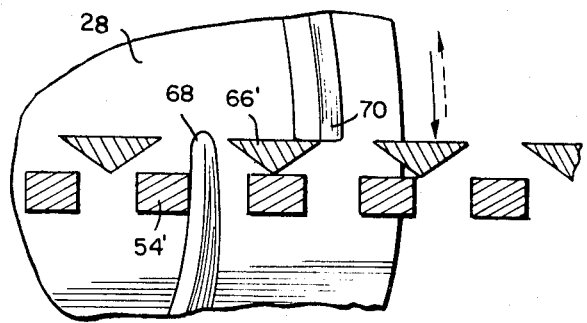
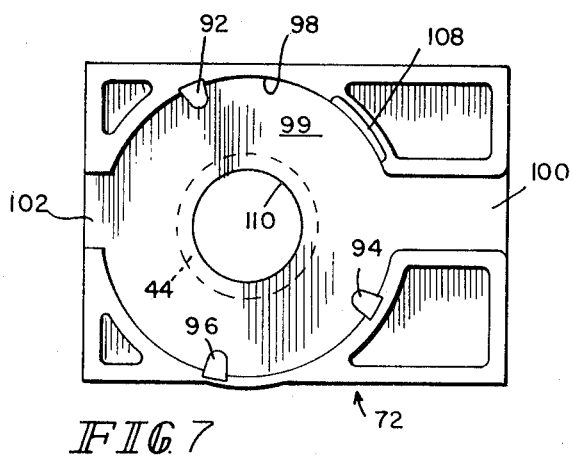
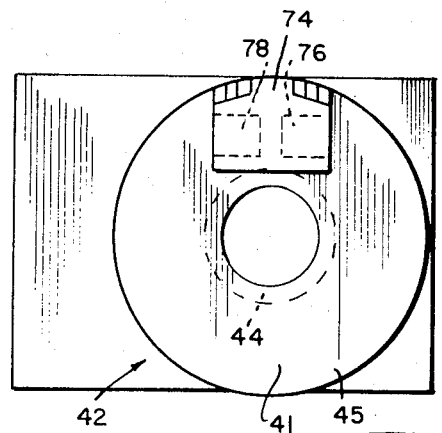
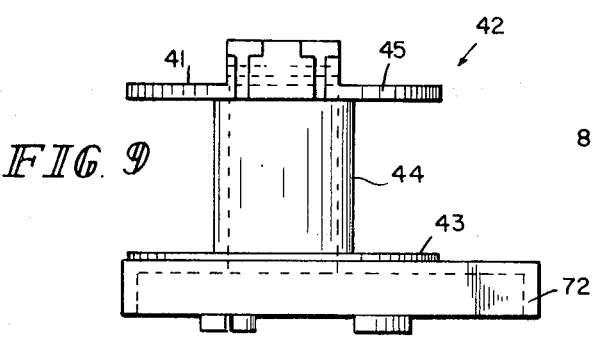
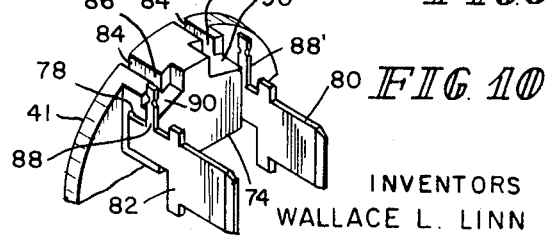
INVENTORS
WALLACE L. LINN
BILL G. KILMER
RICHARD H. WEBER
BY Robert J. Meyer
ATTORNEY

3,735,164

DRIVE ARRANGEMENT INCLUDING A SYNCHRONOUS MOTOR

The present invention relates to a drive means and more particularly to a drive means which includes a synchronous motor.

There are a multitude of applications for small synchronous motors of the type having a permanent magnet rotor. Many of these applications are in timing devices such as clocks and automatic washer-type sequence switches. In the future, these timing devices and thus their drive means will have to be smaller and smaller without much sacrifice of power output. In stove and oven range timers, for example, the synchronous motor driving the timing mechanism must be very simple in structure because of the very tight space limitation imposed on it.

The problem of space limitation becomes even more critical when it is considered that the synchronous motor is usually operated with a speed reduction means and a one-way directional device to insure that the motor will rotate in a proper direction.

Accordingly, the present invention is directed to a drive means which includes a synchronous motor, the complete drive means being relatively small in size with a minimum number of parts and thus being a practical product to manufacture.

It is an object of the present invention, therefore, to provide a drive means which includes a small synchronous motor and having a minimum number of parts and which is therefore simple and easy to produce.

A further object of the present invention is to provide a drive means including a synchronous motor having a novel and efficient one-way directional system for insuring proper rotation of the rotor.

Still another object of the invention is the provision of a drive means having a rotor including a permanent magnet rotatable about an axis and having a driving surface operable in a plane substantially normal to the axis of the rotor, a rotating motion transmission means responsive to the movement of the driving surface and operable in a plane substantially normal to the plane of the driving surface, with the driving surface and the rotating motion transmission means having cooperating means to insure proper directional rotation of the rotor.

Still another object of the invention is the provision of a synchronous motor having a stator structure, the poles of which are arranged in groups to provide good starting characteristics and running torque in a very closely confined space.

A further object of the invention is to provide a synchronous motor having a coil carried by a bobbin, the bobbin including a means for receiving electrical terminals and means providing a passage for wire from the coil to the electrical terminals within the confines of the bobbin.

Another object of the invention is the provision of a means permitting rotation of a permanent magnet rotor in one direction when an associated stator structure is energized by AC current and preventing rotation in an opposite direction which includes a spiral drive coupled to the rotor having an entry-end engaging a drive gear and a terminal end, and stop means engaging the terminal end when the rotor rotates in a wrong direction.

A further object of the invention is the provision of a synchronous motor having a permanent magnet rotor with a plurality of equally spaced permanent poles of alternating polarity, a stator structure of stator poles surrounding and spaced from the permanent poles, and a coil carried by a spool, the spool being carried by a base member, the base member being constructed and arranged to locate and retain the spool, the stator structure, and the permanent magnet rotor in cooperative working relationship with each other.

These and other objects of the invention will become apparent from the following description taken in conjunction with the accompanying drawings wherein:

FIG. 4 is an enlarged view showing portions of gear means forming parts of the directional system for the synchronous motor;

FIGS. 5 and 6 are exploded views taken in section along the circumferential pitch line of two gears of the directional system of the synchronous motor in different operating positions;

FIGS. 7, 8, and 9 are bottom, top and side views respectively of the coil bobbin of the synchronous motor; and FIG. 10 is a perspective view of a portion of the spool forming the bobbin of the synchronous motor.

Generally speaking, the objects of the invention are accomplished by providing a drive means comprising a rotor having a permanent magnet rotatable about an axis and having a plurality of poles about the periphery of the magnet, and having a driving surface operable in a plane substantially normal to the rotor axis; a stator structure including a plurality of stator poles surrounding the rotor and spaced therefrom; means applying a magnetic field to the stator poles; rotating motion transmission means responsive to movement of the driving surface in a plane substantially normal to the plane of the driving surface; and output means coupled to the rotating motion transmission means; each of the driving surface and the rotating motion transmission means including a means cooperating with one another preventing the rotor from rotating in a wrong direction.

The stator structure includes intermeshed poles arranged in groups, there being three groups of five poles and two groups of four poles.

The means applying a magnetic field to the stator poles includes a winding carried by a spool which carries an electrical terminal block for receiving electrical terminals and having means to permit a wire from the coil to pass to the electrical terminals within the confines of the spool. The spool is carried by a base member having means to locate and retain the spool, the permanent magnet rotor and the stator structure in cooperating working relationship with each other.

Figure 1:
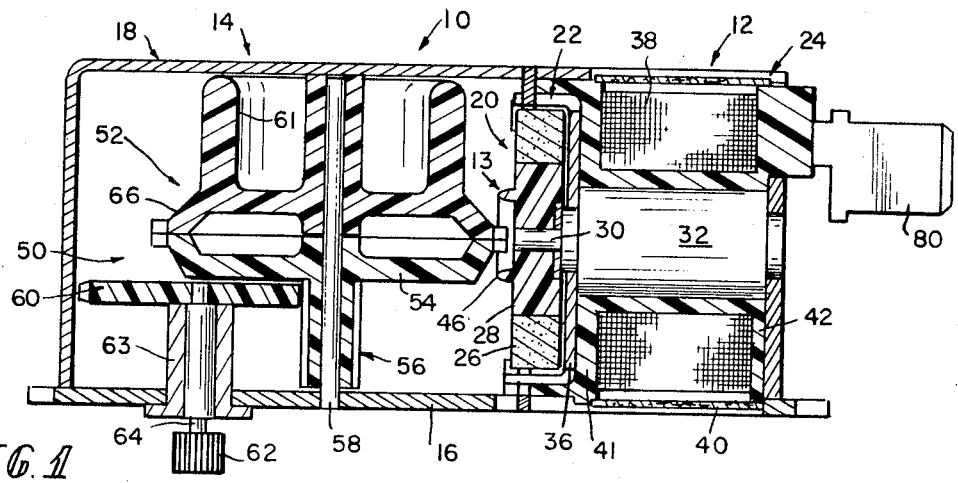
FIG. 1 is a sectional side view of the drive means of the present invention.
Figure 2:
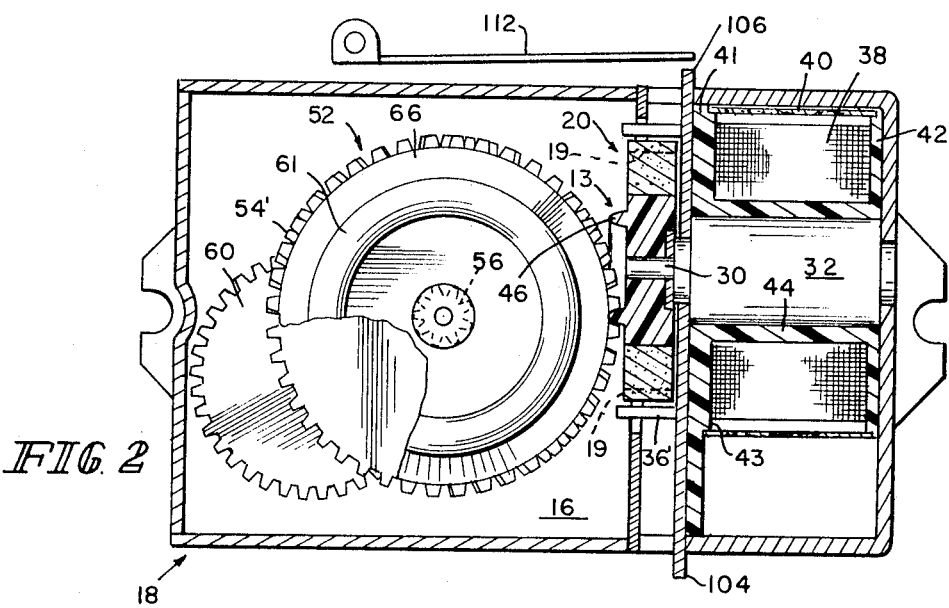
FIG. 2 is a top sectional view of the drive means.
Figure 3:
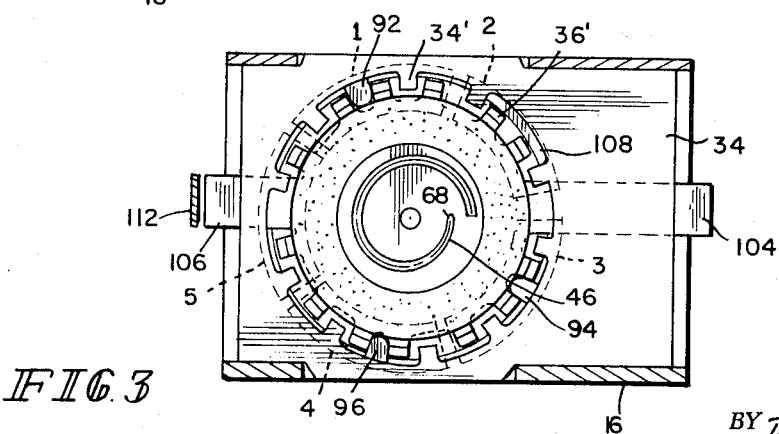
FIG. 3 is a sectional end view of the synchronous motor portion of the drive means.

Referring now to FIGS. 1–3, the present invention contemplates the provision of a drive means 10 comprised generally of a synchronous motor 12 and a rotating motion transmission means 14, the synchronous motor including driving surface 13 coupling the motor to the rotating motion transmission means. Synchronous motor 12 includes a rotor 20, a stator structure 22, and a means 24 applying a magnetic field to the stator structure.

Rotor 20 includes a permanent magnet disc 26 in the shape of a ring carried by a hub 28 which freely rotates on shaft 30. Shaft 30 is fixedly staked to an energized magnetic core 32 fabricated of iron or steel. The permanent magnet disc includes, for example, a ferrous material with a binder with its outer periphery being impressed or magnetized into separate pole segments 19 of alternate north and south polarity. Alternatively, salient poles carried by a separate hub could surround the ring.

Stator structure 22 includes a stator plate 34 having a plurality of poles 34' and a cage 36 having a plurality of poles 36'. The plate 34 and cage 36 may be fabricated from ordinary cold-rolled steel so that magnetic fields may be readily induced in the stator structure. Likewise, at least a portion 18' of the cover plate may be fabricated from cold-rolled steel. Plate 34 with its poles and cover portion 18' provide an outer magnetic field path while cage 36 with its poles provide an inner magnetic field when AC current is applied to the means 24.

As most clearly shown in FIG. 3, the poles 34' and 36' are intermeshed with each other and are arranged in groups to provide good starting characteristics with high running torque for the motor while being confined to a relatively small space. As shown there are five groups 1–5, with three groups (1, 3, and 4) having five poles, and two groups (2 and 5) having four poles. The five-poles groups are arranged in clockwise order P–C–C–P–C, while the four pole groups are arranged P–C–C–P and P–C–P–C in clockwise order for groups 2 and 5 respectively, P and C representing stator plate poles and a cage poles respectively. Two of the three poles groups (3 and 4) are adjacent each other.

The means 24 applying a magnetic field to the stator structure includes a coil or winding 38 encased in a cover or jacket 40 and carried by a bobbin 42, and a means, such as iron core 32, providing a low reluctance path from the coil to the stator structure. Bobbin 42 may be in the form of a spool 45 comprising opposed rims 41 and 43 carried by a spindle 44. As will becomes apparent hereinafter with reference to FIGS. 3 and 7–10, the coil and bobbin are so constructed as to provide passage of a wire of the winding to electrical terminals carried by the bobbin within the confines of the bobbin, and further the bobbin provides means to locate and retain the rotor, stator structure, and coil in cooperating working relationship with each other.

The driving surface 13 includes a spiral 46 which rotates in a plane substantially normal to the axis of the rotor.

Rotating transmission means includes a speed reduction means 50, and a directional stop means 52. Speed reduction means 50 includes a drive gear 54 unitarily constructed with pinion 56 and carried by an axle 58, and gear 60 which is coupled to output pinion 62 through shaft 64. Shaft 64 freely rotates within bushing 63. As shown, spiral 46 engages drive gear 54 such that upon rotation of the rotor, the drive gear is rotated to rotate output pinion 62 through gear 60 and pinion 56.

Referring to FIGS. 1–6, a one-way directional system of the drive means may be described. Such directional prevents continued rotation of the synchronous motor when it starts in the wrong direction; that is, a direction opposite that desired. As will become apparent, the present motor is shown as having a desired counter clockwise rotation, looking at the driving face 13 of the rotor. The one-way directional system includes stop means 52 cooperating with spiral drive 46. More specifically, stop means 52 includes a gear 66 which also rotates about axle 58, the gears 54 and 66 being constructed and arranged with respect to each other such that the entry end 68 of spiral 46 engages gear 54 and passes through the teeth of gear 66 when rotor 20 rotates in the desired direction while the teeth of gear 66 engages the terminal end 70 of spiral 46 to stop the rotor's rotation when it is in the opposite or wrong direction. Referring particularly to FIGS. 4 and 5, drive gear 54 has teeth 54' having involute-shaped profiles 54''. Gear 66 has teeth which have the same root, pitch and outside diameters as the teeth of the drive gear. But the circular thickness T of its teeth is greater than that of the circular thickness t of 54's teeth; and the entry side 66' (side which entry end 68 of spiral 46 enters) of the teeth are beveled. The circular thickness of the teeth of gear 66 being greater than the circular thickness of the teeth of gear 54, there are a greater number of teeth in gear 54 than in gear 66, their outside diameters being the same. The space between the teeth of each gear are substantially the same.

In operation, when AC current is applied to coil 38, the magnetic fields induced in the stator structure 22 will cause rotor 20 to rotate. If the rotor rotates in the desired direction, as shown in FIG. 5, the entry-end 68 of spiral 46 engages gear 54, passes through the teeth, and "pushes aside" one of the teeth of gear 66. During a 360° rotation of the rotor, the spiral 46 advances both gears 54 and 66 and each is turned or rotated by the spiral an angular displacement equal to its circular pitch. Continued rotation of the rotor causes continued rotation of output pinion 62 through pinion 56 and gear 60.

If the rotor starts rotation in a wrong direction, terminal end 70 of spiral 46 engages the back side (FIG. 6) of gear 66 causing the spiral and thus the rotor to bounce back which takes advantage of the rotor's inertia during this nearly elastic collision to cause it to rotate in the right direction. Support for gear 66 when the terminal end 70 "bangs" or abuts against a tooth of the gear is provided by ring shaped flange member 61.

As an alternative, terminal end 70 may be properly sized so as to pass between the teeth of gear 54 when the rotor rotates in a wrong direction, but abut or bang against the teeth of gear 54 when the rotor travels in a wrong direction.

While a particularly useful mechanical directional system has been described, it should be understood that a suitable electrical magnetic system could also be used, such as by shading means for the stator poles.

Referring now to FIGS. 3, 7–10, the coil bobbin of the synchronous motor may be described. Bobbin 42 includes a spool 45 having opposed rims 41 and 43 disposed at each end of a cylinder or spindle 44. The spool is unitarily constructed with a base member 72. A terminal block 74 is carried by rim 41 so as to project outside the spool. Terminal block 74 includes slot 76 and 78 which receive electrical terminals 80 and 82 respectively. As shown, the electrical terminals are bent over after being engaged in the slots to a position substantially normal to the plane of the rim. The rim and the terminal block also includes axially aligned slots 84, 84' and 86, 86' respectively to provide passageways for wire from a coil carried by the spool to the electrical terminals. The wire from the coil is then attached to tabs 88 and 88' of the electrical terminals which are subsequently bent over and received in recesses 90 and 90' provided in the terminal block. The passageways and the recesses keep the wire coming from the coil to the electrical terminals within the confines of the bobbin, thus keeping the whole "package" neat and the wires from unsafe exposure.

Base member 72 provides a means for locating and retaining spool 45, rotor 20 and stator structure 22 in cooperating working relationship with each other. Such means include ribs 92, 94 and 96 provided in the inner surface 98 of circular recess 99, which extends between the poles 36' of the cage 36; channels 100 and 102 which receives tabs 104 and 106 (FIG. 2) which, in turn, carries shaft 30 of the rotor 20 as previously described. Thus the base member 72 locates and retains the basic elements of the synchronous motor-rotor, stator structure, and coil without structural support plate 16 or cover 18'.

In certain applications, such as in range timer applications, a buzzer or other alarm system may be needed to signal the event of a certain event. For example, in a range timer, a buzzer may be needed to signal when the baking is done. For those applications, a buzzing means such as a pivotally mounted clapper arm 112 shown in FIG. 2 may be used which when brought into engagement with or in proximity to tabs 106 or 104 which are magnetically coupled to cage 36 to vibrate and cause audible decibel level buzzing.

What is claimed is:

1. A drive means comprising:
    a. a rotor including a permanent magnet rotatable about an axis and having a plurality of poles of alternating opposite polarities about the periphery of said magnet, and having a driving surface operable in a plane substantially normal to said axis,
    b. a stator structure including a plurality of stator poles surrounding said rotor and spaced therefrom,
    c. means applying a magnetic field to said stator structure,
    d. rotating motion transmission means responsive to movement of said driving surface in a plane substantially normal to said plane of said driving surface,
    e. output means coupled to said motion transmission means, and
    f. said driving surface and said rotating motion transmission means each including cooperating members providing a one-way directional means preventing said rotor from rotating in a wrong direction.

2. A drive means according to claim 1 wherein said one-way directional means comprises a spiral providing said driving surface, said spiral having an entry end engaging a drive gear of said motion transmission means and a terminal end, said motion transmission means further including a stop means engaging said terminal end of said spiral when said rotor rotates in a wrong direction.

3. A drive means according to claim 2 wherein said stop means includes a second gear axially aligned and rotating with said drive gear, said second gear being constructed and arranged so as to engage said terminal end of said spiral when said rotor rotates in a wrong direction to prevent further rotation thereof while permitting said entry-end of said spiral to pass when said rotor turns in a right direction.

4. A drive means according to claim 3 wherein said drive gear includes teeth having involute-shaped profiles and said second gear has teeth of substantially the same root, pitch and outside diameters as said drive gear but having a circular thickness different than that of said drive gear teeth and having beveled sides receiving said entry-end of said spiral.

5. A drive means according to claim 1 wherein said means applying a magnetic field to said stator structure includes a coil.

6. A drive means according to claim 1 wherein said means applying a magnetic field to said stator structure includes a coil including a magnetic field and means providing a low reluctance path to said stator structure for said magnetic field.

7. A drive means according to claim 6 wherein said coil is carried by a bobbin, said bobbin including means receiving electrical terminals and means providing a passage for wire of said coil to said electrical terminals.

8. A drive means according to claim 7 wherein said bobbin includes a spool and said means receiving electrical terminal includes a terminal block carried by a rim of said spool, slots in said terminal block receiving said electrical terminals; and said means providing a wire passage includes aligned slots in said rim and said terminal block, terminating in a recess in said terminal block.

9. A device means according to claim 1 wherein said poles of said stator structure are arranged in groups, there being three groups of five poles, and two groups of four poles, two of said three groups being adjacent each other.

10. A drive means according to claim 1 wherein said stator structure includes intermeshed poles provided by a plate and a cage.

11. A drive means according to claim 10 wherein said intermeshed poles are arranged in groups there being three groups of five poles arranged P-C-C-P-C, and two groups of four poles arranged P-C-C-P-C and P-C-C-P wherein P and C represent poles of said plate and cage respectively.

12. A drive means according to claim 11 wherein two of said five pole groups are adjacent each other.

13. Means permitting rotation of a permanent magnet rotor in one direction when an associated stator structure is energized by alternating current and preventing rotation of said rotor in an opposite direction comprising: a spiral drive coupled to said rotor having an entry-end and a terminal end said entry end engaging a drive gear rotating in a plate normal to the rotational plane of said spiral, and stop means engaging said terminal end when said rotor rotates in a wrong direction.

14. Means according to claim 13 wherein said stop means includes a second gear axially aligned and rotating with said drive gear, said second gear axially aligned and rotating with said drive gear, said second gear being constructed and arranged so as to engage said terminal end of said spiral when said rotor turns in a wrong direction, while permitting said entry-end of said spiral end to pass when said rotor turns in a right direction.

15. Means permitting rotation of a permanent magnet rotor in one direction when an associated stator structure is energized by alternating current and preventing rotation of said rotor in an opposite direction comprising: a spiral drive coupled to said rotor having an entry-end engaging a drive gear and a terminal end, said terminal end sized so as to pass through teeth of said drive gear when said rotor turns in a right direction and abut against said teeth when said rotor turns in a wrong direction.

16. A synchronous motor comprising:
   a. a rotor including a permanent magnet rotor having a plurality if poles about the periphery of said magnet,
   b. a stator structure including a plurality if intermeshed stator poles provided from a plate and a cage and surrounding said rotor and spaced therefrom, said poles arranged in groups there being three groups of five poles arranged clockwise P–C–C–P–C, and two groups of four poles arranged clockwise P–C–P–C and P–C–C–P, and wherein P and C represent poles of said plate and cage respectively, and
   c. means applying a magnetic field to said stator poles.

17. In a synchronous motor wherein a permanent magnet rotor having a plurality of equally spaced permanent poles of opposite polarities rotates about an axis within a stator structure of stator poles surrounding and spaced from said spaced permanent poles, a spool, a coil including a winding connection to a source of alternating current carried by said spool, and a base member unitarily constructed with said spool; said base member including a circular recess receiving said stator structure and ribs disposed along a wall of said recess and between selected poles of said stator structure; and at least one channel provided in a surface of said base member receiving mounting tabs carrying said permanent magnet rotor.

* * * * *